MORRIS BOOKSTABER & MAX BOOKSTABER.
MOTOR.
APPLICATION FILED APR. 7, 1909.

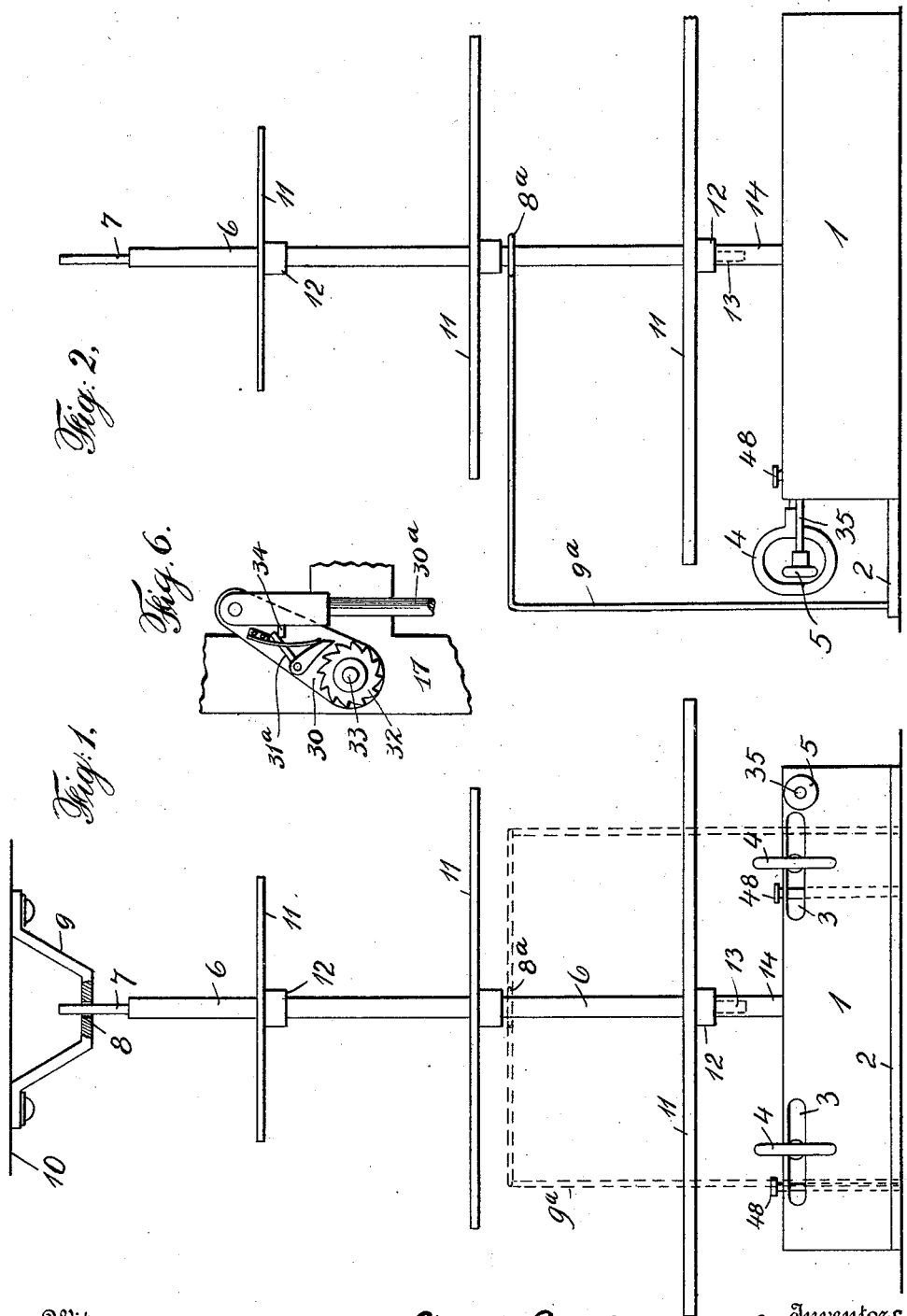

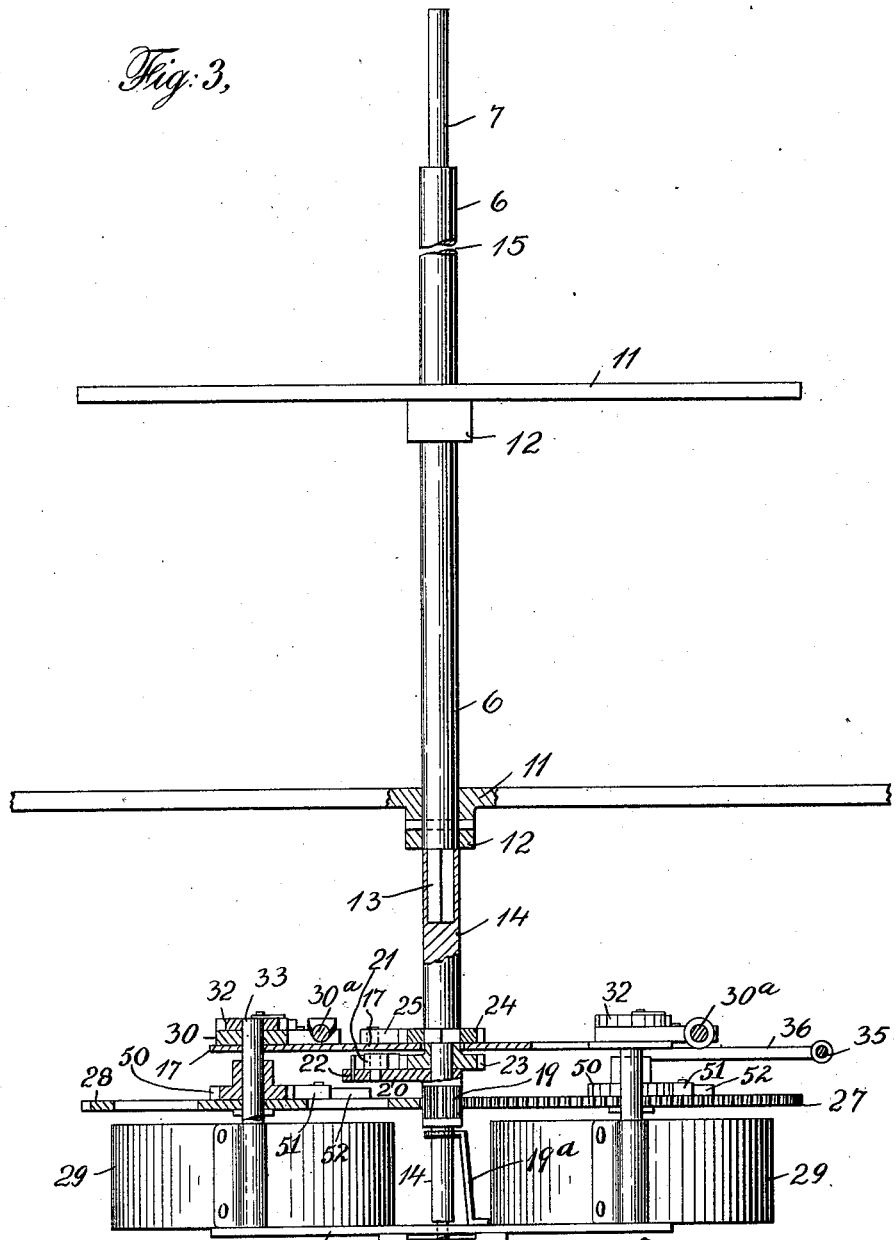

1,000,985.

Patented Aug. 22, 1911.
3 SHEETS—SHEET 3.

Witnesses:
Max B. A. Doring.
Harry Goldstein

Morris Bookstaber
and
Max Bookstaber
Inventors
By their Attorney David B. Getz

UNITED STATES PATENT OFFICE.

MORRIS BOOKSTABER, OF NEW YORK, N. Y., AND MAX BOOKSTABER, OF PATERSON, NEW JERSEY.

MOTOR.

1,000,985.  Specification of Letters Patent.  Patented Aug. 22, 1911.

Application filed April 7, 1909. Serial No. 488,527.

*To all whom it may concern:*

Be it known that we, MORRIS BOOKSTABER and MAX BOOKSTABER, citizens of the United States, residing, respectively, at the borough of Brooklyn, city of New York, in the county of Kings and State of New York, and at the city of Paterson, in the county of Passaic and State of New Jersey, have jointly invented a new and useful Motor, of which the following is a specification.

The invention relates to spring driven motors, and more particularly to such motors which are especially suitable for driving display racks, which are frequently required to rotate comparatively heavy loads at slow speed, the load being stopped frequently and the rack being from time to time rotated by hand much more rapidly than it is driven by the motor.

Objects of the invention are to provide a motor especially adapted to meet these requirements of service; to provide a motor which is simple, durable and reliable, which may be easily controlled as to starting and stopping, and which may be wound easily and rapidly; which is protected against injury by sudden movements of the driven shaft or from the effects of force applied to said driven shaft; to provide a motor which may be started and stopped and wound readily without removing it from a show window or other place where it may be comparatively inconvenient of access.

These and other objects of invention will in part be obvious and will in part more fully appear herein.

The invention consists in the novel parts, arrangements, constructions, combinations and improvements herein shown and described.

The accompanying drawings referred to herein, and forming a part hereof, illustrate one embodiment of the invention, the same serving in connection with the description herein to explain the principles of the invention.

Figure 4:
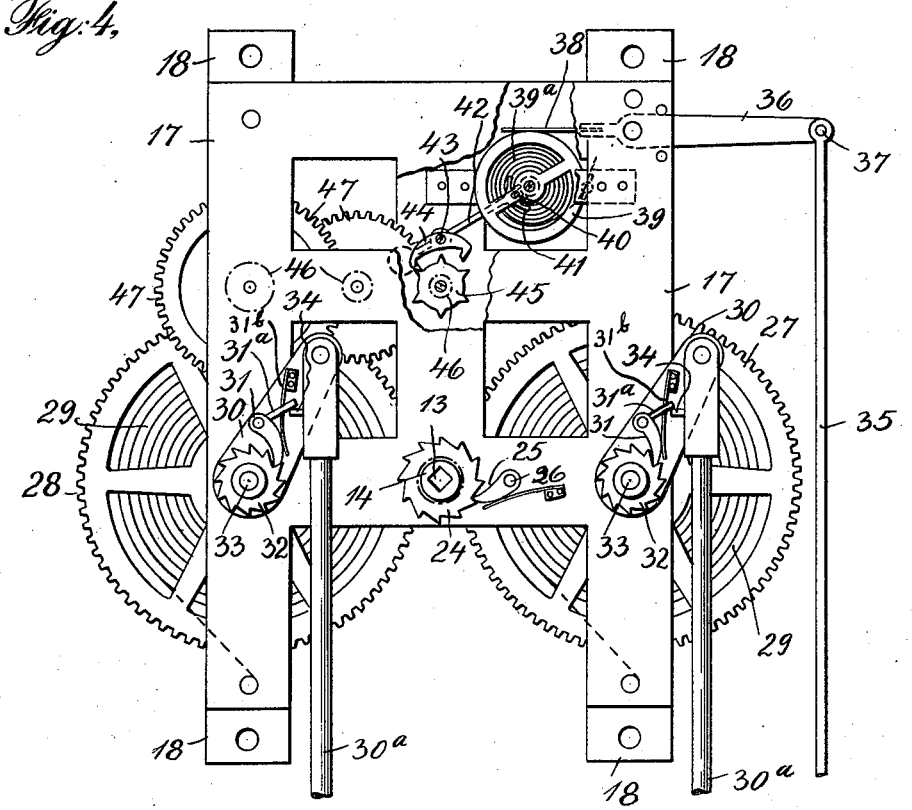
Figure 5:
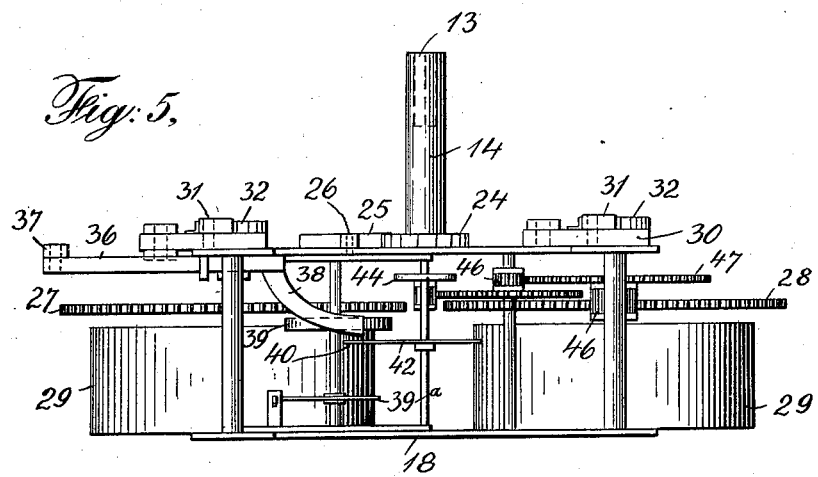

Of the drawings: Figure 1 is an elevation of an incased motor constructed in accordance with the principles of the invention and showing it applied to a display rack; Fig. 2 is an elevation looking at Fig. 1 from the right; Fig. 3 is a view corresponding generally to Fig. 1, showing the casing for the motor removed, and with certain parts in section and certain parts broken away for the sake of clearness; Fig. 4 is a top plan view of the motor with the casing removed, and with the frame broken away over certain of the mechanisms; Fig. 5 is an elevation of the mechanism with the casing removed looking at Fig. 4 from the top; and Fig. 6 is a detail view showing the winding mechanism in the disengaged or inoperative position.

Referring to the accompanying drawings which illustrate by way of example an embodiment of the invention, a suitable casing 1 protects and supports the motor mechanism. This casing is provided with a base 2 upon which it rests. As exemplified in the illustrated embodiment, the motor has two driving springs coöperating together upon a single driven shaft and controlled by a single escapement mechanism. Projecting through openings 3 in the case are reciprocable rods 30ª provided with handles 4. Each of said rods is pivotally connected to an arm 30 carried loosely upon the arbor 33. Fast upon each arbor 33 to rotate therewith is a ratchet wheel 32. A flat coil spring 29 has its outer end anchored to the frame in a well known manner, and its inner end attached to the arbor 33. Pivoted on the loose arm 30 is a pawl 31, spring pressed into the ratchet wheel 32 by the spring 31ᵇ. Said pawl is shown provided with a tail or lug 31ª which coöperates with a lug 34 upon the reciprocable rod 30ª near the end thereof which is pivoted to the arm 30. It will be understood that the corresponding mechanism on the other side of the motor may be substantially a duplicate of the foregoing, and is so shown, and therefore need not be described in detail. In the winding operation the arm 30ª is reciprocated to and fro. As it is drawn downwardly (referred to Fig. 4) the pawl 31ª will engage the ratchet wheel 32 to rotate the shaft 33 and thus wind up the spring 29. A suitable detent device to prevent unwinding will be described later. It will be clearly understood that the pawl 31 returns idly as the arm 30ª moves in the upward direction (referred to Fig. 4). When the rod 30ª receives a further movement in said upward direction, the lug 34 will strike the pawl tail 31ª and throw it out of the ratchet 32, leaving the ratchet free to rotate with the arbor 33 during the running of the motor.

Fixed to rotate with each of the arbors 33 is a ratchet wheel 50 contiguous to the face of the gear wheels 27 on the one side and 28 on the other side, respectively. Fixed to each of said gears is shown a pawl 51 spring pressed by means of a spring 52 into engagement with its ratchet wheel 50. This causes the spring 29 to drive its gear in unwinding, but permits the spring to be wound and the arbor 33 to be rotated in the opposite direction without disturbing the gear. This mechanism also prevents retrogression of the arbor 33 during winding. This detent action is obtained in the following manner. It will be clear that during winding the pawl 51 will ride over the teeth of the ratchet wheel 50. But motion in the opposite direction of the ratchet wheel 50 and arbor 33 is prevented by the ratchet 51 engaging the ratchet wheel teeth. The gear wheels 27 and 28, on which the pawls 51 are mounted, are under the control of the escapement mechanism, and the pawls 51 each thus act as detents to prevent retrogression of the arbors 33 in practically the same manner as though mounted on the frame. The arbors 33 thus move independently of the gears 27 and 28 during the winding of the springs 29 but drive the gears with them as the spring unwinds.

The driven shaft 14 is shown mounted vertically in the motor frame, being journaled in the top frame plate 17, and having the reduced lower end 16 journaled in the bottom frame plate 18, with its end resting upon a supporting member 18ª. This supporting member 18ª, and the end 16 of the driven shaft as well, may be made of hardened metal if desired to resist wear. Mounted upon the shaft 14 so as to rotate freely thereon is a pinion 19, supported in position by suitable means such as a bracket 19ª. Integral with or fixed to said pinion is a projecting arm 20 upon which is pivoted a pawl 21 by means of a pin 22. This pawl 21 is spring pressed into engagement with a ratchet wheel 23 fixed upon the shaft 14 to rotate therewith. Another ratchet wheel 24 fixed on said shaft 14 to rotate therewith is shown just above the frame plate 17. Said ratchet 24 is engaged by the spring pressed pawl 25 pivoted on the top plate 17 by the pivot 26. This mechanism acts to prevent the display rack, or other driven device, being turned by the hand in the opposite direction from that in which it is being driven, which would injure the mechanism which is in train back to the spring and to the escapement. This is prevented by the pawl 25 engaging the ratchet wheel 24. The rack may be rotated freely and rapidly by hand in the opposite direction, that is, the direction of driving, without disturbing the driving mechanism, as in that case the ratchet 24 would run freely under its pawl 25 as would likewise the ratchet wheel 23 run under its pawl 21. As the drive from the motor acts through the pinion 19 and the arm 20, it will be seen that it is the arm 20 and pawl 21 which are rotated, the pawl thus engaging the ratchet 23 to drive the shaft 14.

A suitable gear train is shown connecting the gear wheel 28 to the escapement mechanism. It is shown as a series of concentric pinions 46 and gears 47, fixed to rotate together and being merely idlers for the purpose of transmission, need not be further described. The last pinion 46 has a common arbor with the escapement wheel 45. This escapement wheel has coöperating therewith the anchor escapement 44, mounted to rock on the bearing 43, and having the arm 42 integral therewith. Coöperating with the arm 42 is the hair spring 39ª of the balance wheel 39.

For the purpose of starting and stopping the motor, a brake is shown applied to the periphery of the balance wheel. Said brake comprises a shoe 38 carried by the lever 36 pivoted at 37 to the reciprocable arm 35, which terminates in the knob 5 exterior to the motor casing and contiguous to one of the winding handles 4.

As previously indicated, one of the principal uses for which the motor is designed is to drive a display rack, and in Figs. 1, 2 and 3 the motor is shown applied to such use. A column or standard 6 is shown fitting into the vertical shaft 14 by means of the squared end of said column fitting into the correspondingly recessed end 13 of the shaft. Carried upon said column are shown a plurality of tables 11 having collars 12 thereon fastened to the column in a suitable manner, as by a pin passing through the collar and the standard as shown in Fig. 3. Suitable means are provided for steadying and centering the column 6 against the tilting tendency due to irregular disposal of articles upon the tables 11 or differences in the distribution of weight due to such articles. For this purpose a bracket 9 is shown secured to a ceiling or other support 10. The upper part of the column is shown consisting of a narrow part 7 journaled in an opening 8 in the bracket 9. The parts may be arranged so that the column 6 may be lifted upwardly until the squared end is out of the recess 13 in the top of the shaft 14, the member 7 passing upwardly into the space between the bracket 9 and its support, or through an aperture in said support. The column 6 is shown broken at the point 15 to indicate that it can be made of varying heights. If desired the column 6 may be supported instead by means of supports 9ª fixed to the base 2 of the motor and extending upwardly clear of the tables 11 and being then bent inwardly to embrace said column, while leaving it free to rotate, as shown in full lines in Fig. 2 and in dotted lines in Fig. 1.

The manner of use and of operation of the device will be clearly understood from the foregoing, as well as its objects and advantages. It will be understood that variations may be made in the construction within the scope of the appended claims.

Having thus fully described our invention, we claim:

1. The combination with a driven shaft of a ratchet wheel fast thereto, a pinion loose thereon, an arm fixed to rotate with said pinion, a pawl upon said arm engaging said ratchet wheel, driving mechanism for said pinion, a second ratchet wheel fast on said shaft and having its teeth inclined in the same direction as said first mentioned ratchet wheel, a pawl for said last mentioned ratchet wheel, and a fixed support on which said pawl is mounted.

2. The combination with an arbor, of a gear wheel rotated thereby, a spring for rotating said arbor, a ratchet wheel fixed to rotate with said arbor, an arm concentric with said ratchet wheel, a pawl upon said arm, a spring mounted upon said arm and pressing said pawl into engagement with said wheel, a longitudinally reciprocating rod connected to said arm to actuate same, a lug on said pawl against which said rod acts to throw the pawl at one end of its travel out of its ratchet to permit the arbor to rotate in the opposite direction.

3. The combination with a vertically arranged driven shaft, of a ratchet fixed to said shaft, a pinion loosely mounted on said shaft and having an arm fixed thereto, a pawl upon said arm engaging said fixed ratchet, a horizontally arranged gear engaging said loose pinion, a spring driven arbor with which said gear is concentric, a spring for driving said arbor, a ratchet concentric with and fixed on said arbor, and a spring pressed pawl mounted on said gear and engaging said ratchet.

4. The combination with a vertically arranged driven shaft, of a ratchet fixed to said shaft, a pinion loosely mounted on said shaft and having an arm fixed thereto, a pawl upon said arm engaging said fixed ratchet, a horizontally arranged gear engaging said loose pinion, a spring driven arbor with which said gear is concentric, a spring for driving said arbor, a ratchet fixed on said arbor, a spring pressed pawl mounted on said gear and engaging said ratchet, a second ratchet concentric with and fixed on said arbor, an arm loosely mounted on said arbor, a pawl mounted on said arm and engaging said ratchet and actuating means for said arm.

5. The combination with a vertically arranged driven shaft, of a ratchet fixed to said shaft, a pinion loosely mounted on said shaft and having an arm fixed thereto, a pawl upon said arm engaging said fixed ratchet, a horizontally arranged gear engaging said loose pinion, a spring driven arbor with which said gear is concentric, a spring for driving said arbor, a ratchet fixed on said arbor, a spring pressed pawl mounted on said gear and engaging said ratchet, a second ratchet fixed on said arbor, an arm loosely mounted on said arbor, a pawl mounted on said arm and engaging said ratchet and a longitudinally reciprocating rod pivotally connected to said arm.

6. The combination with a casing of a driven shaft, a driving spring within the casing, an arbor to which said driving spring is connected, a ratchet fixed on said arbor, an arm mounted loosely on said arbor, a pawl on said arm engaging said ratchet wheel, a longitudinally reciprocating rod pivoted to said arm to actuate it, a balance wheel for controlling the action of said driving spring, a brake for engaging said balance wheel, and a longitudinally moving rod for putting said brake on and off, said two rods projecting from the casing.

7. The combination with an arbor of a gear wheel rotated thereby, a spring for rotating said arbor, a ratchet wheel fast on said arbor, an arm loose on said arbor, a spring pressed pawl for said ratchet wheel mounted on said arm, a member for reciprocating said arm to wind the spring, and means between said reciprocating member and said pawl to throw it out of the ratchet at one end of the path of the reciprocating arm to permit the movement of the arbor in the opposite direction under the drive of the spring.

8. A spring motor device including in combination a base upon which the device stands, a driven shaft extending upwardly therefrom, means carried upon, and extending outwardly from said shaft for supporting a load, a driving spring, and a gear driven thereby, a pinion loose to rotate on said driven shaft, an arm fixed to rotate with said pinion, a ratchet fixed on said driven shaft, a spring pressed pawl on said arm engaging said ratchet wheel, a second ratchet fixed on said shaft, a check pawl cooperating therewith to prevent reverse movement of said driven shaft and a support engaging the upper part of said shaft whereby the shaft is held in vertical alinement and prevented from binding and stopping the mechanism when the load upon said supporting means is unevenly distributed around said shaft.

In testimony whereof, we affix our signatures in presence of two witnesses.

MORRIS BOOKSTABER.
MAX BOOKSTABER.

Witnesses:
WILLIAM DEWEY,
HENRY SCHOTT.

Copies of this patent may be obtained for five cents each, by addressing the "Commissioner of Patents, Washington, D. C."